United States Patent
Brandt et al.

(10) Patent No.: US 8,637,200 B2
(45) Date of Patent: Jan. 28, 2014

(54) FUEL CELL SYSTEM OPERATING PROCESS

(75) Inventors: Samuel Brandt, Esslingen (DE);
Richard Schmidt, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 466 days.

(21) Appl. No.: 12/707,093

(22) Filed: Feb. 17, 2010

(65) Prior Publication Data

US 2010/0209790 A1    Aug. 19, 2010

(30) Foreign Application Priority Data

Feb. 19, 2009   (DE) .......................... 10 2009 009 666

(51) Int. Cl.
*H01M 8/06* (2006.01)
*H01M 8/04* (2006.01)

(52) U.S. Cl.
USPC ............ 429/434; 429/423; 429/429; 429/433

(58) Field of Classification Search
USPC .................. 429/423, 429, 433, 434
See application file for complete search history.

(56) References Cited

U.S. PATENT DOCUMENTS

| 6,436,561 | B1* | 8/2002 | Hart-Predmore et al. | ..... 429/425 |
| 6,740,303 | B2 | 5/2004 | Boneberg et al. | |
| 7,326,482 | B2 | 2/2008 | Haltiner, Jr. et al. | |
| 2005/0123812 | A1* | 6/2005 | Okamoto | ......... 429/24 |
| 2006/0083964 | A1* | 4/2006 | Edlinger et al. | ............... 429/17 |
| 2006/0134473 | A1* | 6/2006 | Edlund et al. | .................... 429/13 |
| 2006/0141295 | A1 | 6/2006 | Sato et al. | |
| 2007/0298289 | A1* | 12/2007 | Clingerman et al. | ........... 429/13 |
| 2008/0268308 | A1 | 10/2008 | Schilling et al. | |

FOREIGN PATENT DOCUMENTS

| DE | 101 04 607 A1 | 8/2002 |
| DE | 10 2004 059 495 A1 | 6/2006 |
| DE | 10 2006 014 197 A1 | 10/2007 |
| WO | 00/22690 A1 | 4/2000 |

* cited by examiner

*Primary Examiner* — Eugenia Wang
(74) *Attorney, Agent, or Firm* — McGlew and Tuttle, P.C.

(57) ABSTRACT

A process is provided for operating a fuel cell system (1), especially in a motor vehicle, wherein the fuel cell system (1) includes at least one reformer (2) and at least one fuel cell (3). To prolong the service life of the system (1), a warm-holding mode is carried out after switching off the fuel cell system (1). During the warm-holding mode an educt containing hydrogen and carbon monoxide is fed to the reformer (2) and reacted with air in reformer (2) at a catalyst (5) of reformer (2) in an exothermal reaction.

18 Claims, 1 Drawing Sheet

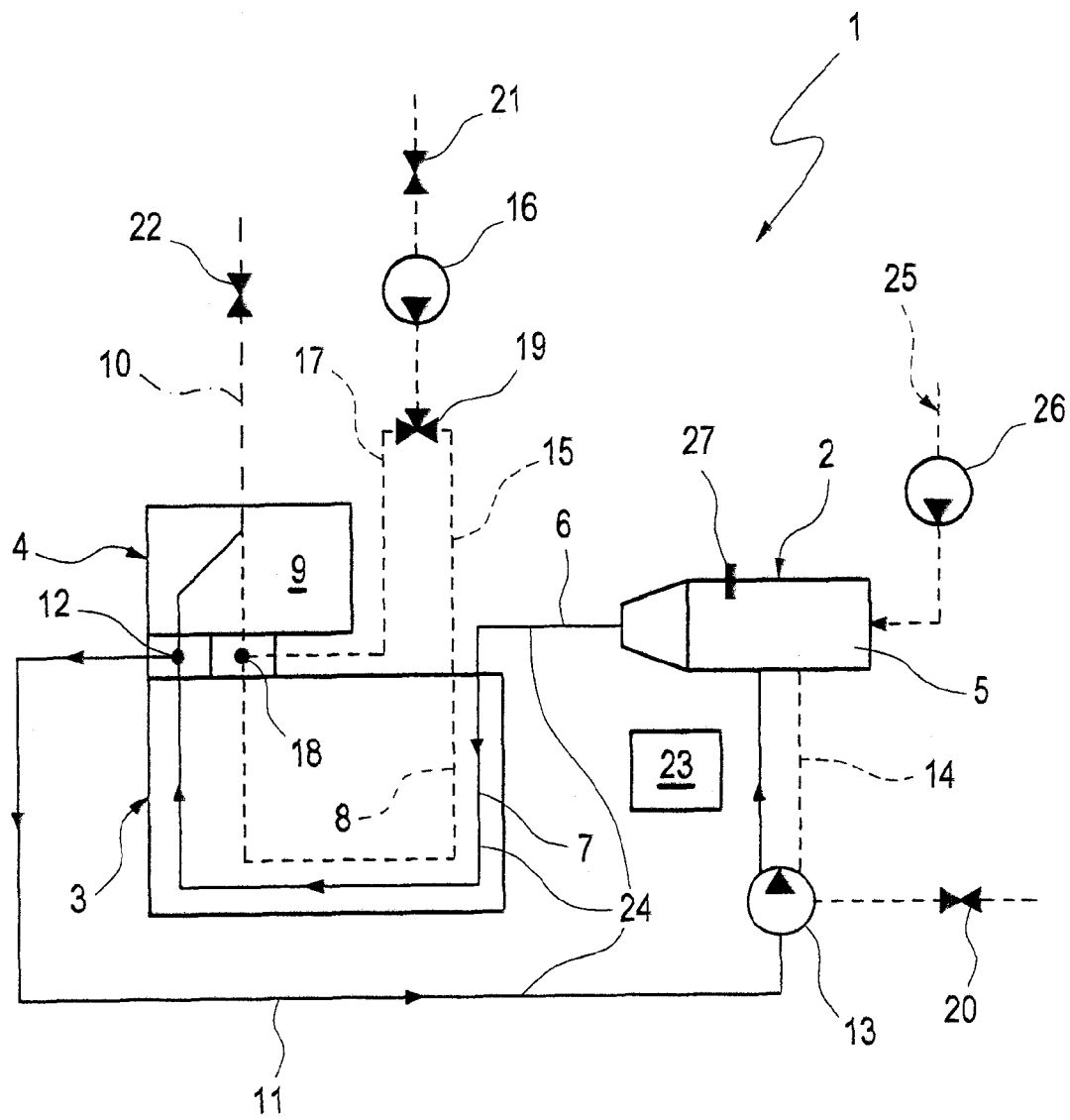

FUEL CELL SYSTEM OPERATING PROCESS

CROSS REFERENCE TO RELATED APPLICATIONS

This application claims the benefit of priority under 35 U.S.C. §119 of German Patent Application DE 10 2009 009 666.3 filed Feb. 19, 2009, the entire contents of which are incorporated herein by reference.

FIELD OF THE INVENTION

The present invention pertains to a process for operating a fuel cell system, especially in a motor vehicle. The present invention also pertains to a fuel cell system.

BACKGROUND OF THE INVENTION

A fuel cell system usually comprises a reformer for generating a reformate gas as well as a fuel cell, to which the reformate gas is fed on the anode side. The anode gas can be reacted electrochemically in the fuel cell together with a cathode gas, while electric current is formed.

At least the aforementioned components of the fuel cell system have comparatively high operating temperatures during the operation of the fuel cell system, i.e., during a state of operation during which electric current can be tapped. Cold start of the fuel cell system, i.e., running up the power of the fuel cell system starting from an ambient temperature leads to an extremely high thermal and chemical load on the individual components. To keep this load as low as possible, attempts are made to carry out the cold start as gently as possible and hence slowly. The cold start of a fuel cell system may consequently take several hours. Shorter cold start processes and/or frequent cold starts significantly reduce the service life of the fuel cell system.

SUMMARY OF THE INVENTION

The object of the present invention is to propose an improved embodiment for a fuel cell system or for a corresponding operating process, which is characterized especially by longer service life of the fuel cell system.

According to the invention, a process is provided for operating a fuel cell system. The process comprises providing a fuel cell system comprising at least one reformer with a catalyst and at least one fuel cell. The process includes operating the fuel cell and switching off the fuel cell. The process carries out a warm-holding mode after switching off the fuel cell system. During the warm-holding mode an educt containing hydrogen and carbon monoxide is fed to the reformer. The educt is reacted with air in the reformer at the catalyst of reformer in an exothermal reaction.

According top another aspect of the invention, a fuel cell system is provided for a motor vehicle. The system comprises a fuel cell, a reformer and a control for controlling operation of the fuel cell system. The control is designed and programmed for operating the fuel cell and switching off the fuel cell. The control carries out a warm-holding mode after switching off the fuel cell. During the warm-holding mode an educt containing hydrogen and carbon monoxide is fed to said reformer. The educt is reacted with air in the reformer at the catalyst of reformer in an exothermal reaction.

The present invention is based, in principle, on the general idea of reducing the number of cold starts and using warm starts, instead, i.e., start modes in which essential components of the fuel cell system, especially the reformer and the fuel cell, have a minimum warm start temperature. This is accomplished in the present invention by carrying out, after switching off the fuel cell system, a warm-holding mode, which maintains the essential components of the fuel cell system at a temperature level that makes a warm start possible. To compensate the cooling, i.e., the radiation of heat of the fuel cell system into the environment, the present invention proposes that an educt containing hydrogen and carbon monoxide be reacted with air in an exothermal reaction at a catalyst of the reformer. As a result, heat can be generated within the fuel cell system with means already contained in the fuel cell system. This internal heat of the system can be used to maintain the essential components of the fuel cell system at a temperature level suitable for a warm start. Cold starts can thus be avoided, as a result of which the load of the fuel cell system can be reduced and its service life prolonged.

Corresponding to an advantageous embodiment, the educt may circulate in an educt circuit, which comprises an anode gas path passed through the fuel cell, a recirculation path returning anode waste gas from the fuel cell to the reformer, and a reformate gas path sending reformate gas from the reformer to the fuel cell. Due to the circulation of the educt in said educt circuit, the heat generated at the catalyst of the reformer can also be fed to the fuel cell. It is thus ensured that at least the reformer and the fuel cell as well as components coupled with the educt circuit in a heat-transferring manner can be maintained by means of the internal generated heat of the system at a temperature level suitable for a warm start. It is, in addition, possible due to the use of such an educt circuit to use the hydrogen gas and carbon monoxide gas, which is contained in the remaining reformate gas after switching off the fuel cell system, in the remaining anode gas and in the remaining anode waste gas, at first to generate heat at the catalyst of the reformer. Due to the utilization of the chemically bound energy still present in the system, the warm-holding mode being presented here makes do without external supply of additional chemical energy carriers at least for a comparatively long time.

If the warm-holding mode is to be maintained for a longer period of time, it is possible, in addition, corresponding to a special embodiment, to meter fuel to the reformer, which fuel is reacted in the reformer with air in an exothermal reaction and/or is partially oxidized to generate hydrogen gas and carbon monoxide gas. In other words, the reformer can be operated for the warm-holding mode either in a reformer operating mode, in which a reformate gas containing hydrogen gas and carbon monoxide is generated by the partial oxidation of the hydrocarbon fuel fed in, or in a burner operating mode, in which the fuel fed is completely oxidized, i.e., not with the goal of generating a reformate gas. A sufficient amount of heat can be released at the catalyst of the reformer in both cases in order to compensate the cooling of the fuel cell system.

It is obvious that the above-mentioned features, which will also be described below, can be used not only in the particular combination indicated, but in other combinations or alone as well without going beyond the scope of the present invention.

Preferred exemplary embodiments of the present invention are shown in the drawings and will be explained in more detail in the following description. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
The only FIG. 1 shows a highly simplified, circuit diagram-like general view of a fuel cell system.

DESCRIPTION OF THE PREFERRED EMBODIMENTS

Referring to the drawings in particular, corresponding to FIG. 1, a fuel cell system 1 (shown only partially) comprises at least one reformer 2 and at least one fuel cell 3. The fuel cell system 1 is preferably arranged in a motor vehicle, not shown here, and can be used there as a source operating independently from an internal combustion engine of the vehicle to generate electricity, for example, as an additional power generator or auxiliary power unit, a so-called APU.

The fuel cell system 1 comprises, moreover, a residual gas burner 4, which is arranged downstream of the fuel cell 3, in the example being shown.

Reformer 2 contains a catalyst 5, by means of which a reformate gas containing hydrogen gas and carbon monoxide, which is then fed to the fuel cell 3 via a reformate gas path 6, is generated from a hydrocarbon fuel by means of partial oxidation in a normal reformer operating mode. The reformate gas path 6 is connected for this to an anode gas path 7 of the fuel cell 3. The anode gas path 7 is separated via an electrolyte, not shown here, from a cathode gas path 8, which likewise passes through the fuel cell 3. The anode gas path 7 and the cathode gas path 8 are led separately out of the fuel cell 3 and into the residual gas burner 4, so that a mixture formation from anode waste gas and cathode waste gas as well as a reaction of this mixture by combustion take place only in a combustion chamber 9 of the residual gas burner 4. An exhaust gas path 10 leads away from the residual gas burner 4.

The fuel cell system 1 has, besides, a recirculation path 11, by means of which anode waste gas can be returned to the reformer 2. The recirculation path 11 is connected for this to the anode gas path 7 on the inlet side via a tapping point 12 downstream of the fuel cell 3. The tapping point 12 is preferably arranged in the example between the fuel cell 3 and the residual gas burner 4, i.e., before the anode waste gas is introduced into the combustion chamber 9. A delivery means 13, which may be a blower or a compressor in the example, is arranged in the recirculation path 11. The delivery means 13 is used to drive the returned anode waste gas. It may be designed as a hot gas delivery unit, so that uncooled hot anode waste gas can be delivered to the fuel cell 3. However, it is also possible, in addition, to integrate in the recirculation path 11 upstream of the delivery means 13 a heat exchanger, by means of which, for example, air, which is fed to the reformer 2, can be preheated.

A reformer air path 14 is provided to supply the reformer 2 with air or reformer air. The reformer air path 14 may be connected to the reformer 2 separately from the recirculation path 11. However, the same delivery means 13 is provided in the example for driving the recirculated anode waste gas and for driving the reformer air. It is consequently advantageous to combine the reformer air path 14 and the recirculation path 11 downstream of the delivery means 13 or to lead them in a common line. The delivery means 13 can then be connected on the suction side separately to the recirculation path 11 and to the reformer air path 14.

Air or fuel cell air is usually used as cathode gas for supplying the fuel cell 3. A corresponding fuel cell air path is designated by 15 in FIG. 1. An additional delivery means 16, which may be, in principle, a blower, pump or the like, is arranged in this fuel cell air path 15. A cooling gas path 17, via which cooling gas, namely, air, can be fed to the residual gas burner 4, branches off in the example from the fuel cell air path 15 downstream of the corresponding delivery means 16 and upstream of the fuel cell 3. The cooling gas path 17 is connected for this in the example to the cathode gas path 8 via an inlet point 18 downstream of the fuel cell 3. The inlet point 18 is located here, moreover, upstream of the burner 4 and upstream of the combustion chamber 9. The cooling gas is thus fed to the cathode waste gas only. It is likewise possible, in principle, to provide a separate cooling gas path within the burner 4 to improve the cooling effect. The quantity of cooling gas fed to the residual gas burner 4 can be set or controlled by means of a corresponding valve means 19.

To set or control the reformer air fed to the reformer 5, a control valve 20 is provided, moreover, in the fuel cell system 1 being shown here, which said control valve is arranged in the reformer air path 14 upstream of the delivery means 13. Furthermore, another valve 21, which may be designed as a shut-off valve or as a control valve, is provided in the fuel cell air path 15 upstream of the corresponding delivery means 16 in the exemplary embodiment being shown. Another valve 22, which is preferably designed as a shutoff valve, is located here in the exhaust gas path 10 downstream of the residual gas burner 4.

Finally, the fuel cell system 1 comprises, moreover, a control 23, which is used to operate the fuel cell system 1 and which is correspondingly connected to the individual components of the fuel cell system 1 in a suitable manner. Corresponding connection lines for transmitting control signals, sensor signals and the like are omitted here for the sake of a simplified view. Control 23 is designed or programmed such that it can operate the fuel cell system 1 according to the operating process described below.

With the fuel cell system 1 switched on, reformer 2 generates reformate gas, which is fed as anode gas to the fuel cell 3. The fuel cell 3 reacts the anode gas at least partially with the cathode gas, while electricity is generated and tapped at the fuel cell 3. The corresponding electrodes are not shown here. A reaction of anode waste gas with cathode waste gas takes place in the residual gas burner 4 in order to make it possible to remove waste gases that are as pollutant-free as possible from the residual gas burner 4. Unneeded anode gas or anode waste gas can be returned—depending on the operating mode of the fuel cell system 1—via the recirculation path 11 to the reformer 2 in order to support the reforming process there or in order to be fed again to the fuel cell 3.

The fuel cell system 1 is switched off when it is no longer needed for power generation. After switching off, the control 23 operates the fuel cell system 1 in a warm-holding mode, which is characterized in that an educt, which contains hydrogen and carbon monoxide, is reacted with air in an exothermal reaction at the catalyst 5 of the reformer 2. To also make it possible to feed the heat released in the process to the fuel cell 3, the educt circulates in an educt circuit 24, which comprises the anode gas path 7, recirculation path 11 and reformate gas path 6. Corresponding to a preferred embodiment, the reformate gas still contained in the fuel cell system 1 or anode gas or anode waste gas is used at first as the educt. The hydrogen and the carbon monoxide of the educt are now present as hydrogen gas and carbon monoxide gas. The reformate gas contained in the reformer 2 and in the reformer gas path 6 reaches the catalyst 5 via the educt circuit 24. The anode gas present in the fuel cell 3 reaches the catalyst via the educt circuit 24. The anode waste gas present in the recirculation path 11 likewise reaches the catalyst 5 via the educt circuit 24.

The delivery means 13 present in the recirculation path 11 anyway may be used to drive the educt in the educt circuit 24. No additional effort is thus necessary for embodying the warm-holding mode. To prevent infiltrated air from entering the educt circuit 24 via the fuel cell air path 15 or via the cooling gas path 17, the fuel cell air path 15 can be closed by means of valve 21. In addition, the exhaust gas path 10 can be closed by means of valve 22 to prevent, besides, waste gas from being sucked in. To have a sufficient quantity of air available at the catalyst 5 for the reaction of the hydrogen and carbon monoxide or of the hydrogen gas and carbon monoxide gas, a corresponding quantity of air can be metered via the control valve 20 arranged in the reformer air path 14. The air should be added at most in a stoichiometric quantity, but preferably in a substoichiometric quantity in order to prevent a contact between the anode side of the electrode of the fuel cell 3 and oxygen.

As soon as the hydrogen present in the fuel cell system 1 or the carbon monoxide is/are used up, fuel can be metered, besides, to the reformer 2 in the usual manner. A corresponding fuel supply or fuel feed means is indicated by broken line here and is designated by 25. It contains a corresponding delivery means 26 and uses especially the same hydrocarbon fuel that is also used to operate the internal combustion engine of the motor vehicle equipped with the fuel cell system 1, i.e., typically gasoline, diesel fuel or natural gas. Reformer 2 may be operated, in principle, as a burner to react the fuel at the catalyst 5 of reformer 2 with air. The fuel is fully oxidized with a sufficient quantity of air in such a burner operating mode. It is clear in this connection that partial oxidation or partially oxidized reaction products, for example, hydrogen gas and carbon monoxide, may be parasitically formed as well. It is also unnecessary to react the total quantity of fuel fed. As an alternative, reformer 2 may also be operated as a reformer, i.e., in a reformer operating state. The hydrocarbon fuel fed is partially oxidized in this reformer operating state, such that hydrogen gas and carbon monoxide are formed. The reformate gas can be generated in this manner. This reformer operating mode corresponds to the normal reformer operation, which reformer 2 carries out when the fuel cell system 1 is switched on in order to supply the fuel cell 3 with reformate gas.

Corresponding to an especially advantageous embodiment, air is fed or added for the exothermal reaction of the educt only when the temperature of the reformer 2 has dropped below a minimum warm start temperature of the reformer or below a temperature limit. The minimum warm start temperature of the reformer is, e.g., 300° C. Said temperature limit is now above the minimum warm start temperature of reformer 2. By taking this temperature limit into account, the actual temperature of reformer 2 can be prevented from dropping below the minimum warm start temperature. The distance between the temperature limit and the minimum warm start temperature may be small, for example, smaller than 50° C. or smaller than 20° C.

The temperature of reformer 2 can be monitored, for example, with a temperature sensor 27, which is coupled with control 23 in a suitable manner. This embodiment according to the invention provides the result that even though the educt gas does circulate in the educt circuit 24 at the beginning of the warm-holding mode with the delivery means 13 switched on, it is not reacted at the catalyst 5. This educt circulation has the advantage that heat can be permanently transferred from the fuel cell 3 to the reformer 2. This is based on the consideration that when the fuel cell system 1 is switched off, reformer 2 cools more rapidly than the fuel cell 3. Reformer 2 can be kept warm for a longer time due to the heat transfer from the fuel cell 3 to reformer 2. In particular, the temperature level of reformer 2 can thus be maintained above the minimum warm start temperature or above said temperature limit for a comparatively long time.

As soon as the air is supplied an exothermal reaction of the educt takes place. This is carried out by means of control 23 in a specific manner such that the temperature of reformer 2 will not drop below the minimum warm start temperature of reformer 2.

This addition of fuel can be carried out automatically after the end of a certain warm-holding operating time or specifically only when the hydrogen gas and carbon monoxide gas of the educt have been consumed. This can take place again, for example, by monitoring the temperature of reformer 2 or of the catalyst 5. It is also possible, as an alternative, to supply the fuel quasi at the beginning of the warm-holding mode.

The heat transfer from the fuel cell 3 to the reformer 2 can be carried out, for example, via the mass flow of the educt in the educt circuit 24 by means of control 23 in a specific manner such that the temperature of reformer 2 will not drop below the reformer's minimum warm start temperature or below the above-mentioned temperature limit. The point in time at which the exothermal reaction of the hydrogen and carbon monoxide is started within the framework of the warm-holding mode can be put off for a very long time.

While specific embodiments of the invention have been described in detail to illustrate the application of the principles of the invention, it will be understood that the invention may be embodied otherwise without departing from such principles.

What is claimed is:

1. A process for operating a fuel cell system, the process comprising:
   providing a fuel cell system comprising a delivery means, at least one reformer with a catalyst and at least one fuel cell;
   operating the at least one fuel cell;
   switching off the fuel cell system;
   carrying out a warm-holding mode after switching off the fuel cell system; and
   during the warm-holding mode feeding an educt containing hydrogen and carbon monoxide to the at least one reformer and reacting the educt with air in the at least one reformer at the catalyst of said at least one reformer in an exothermal reaction, wherein heat from said at least one fuel cell is transferred directly to said at least one reformer via said educt and said delivery means during said warm-holding mode, whereby said at least one reformer is maintained in a pre-heated condition via said educt and via said delivery means during said warm-holding mode.

2. The process in accordance with claim 1, wherein the educt circulates in an educt circuit, the educt circuit comprising an anode gas path passed through the at least one fuel cell, a circulation path returning anode waste gas from the at least one fuel cell to the at least one reformer and a reformate gas path sending reformate gas from the at least one reformer to the at least one fuel cell.

3. The process in accordance with claim 2, wherein said delivery means is arranged in the recirculation path for circulating the educt in said educt circuit.

4. The process in accordance with claim 2, wherein:
   heat transfer is carried out, by means of the educt, from the at least one fuel cell to the at least one reformer during the warm-holding mode before the air is supplied for the exothermal reaction of the educt;

the heat transfer takes place by the educt circulating in the educt circuit.

5. The process in accordance with claim 1, wherein the air is added via a reformer air path feeding air to the at least one reformer.

6. The process in accordance with claim 1, wherein in addition, fuel is added to the at least one reformer, and said fuel is reacted with the air in the at least one reformer in an exothermal reaction and/or partially oxidized to generate hydrogen gas and carbon monoxide.

7. The process in accordance with claim 6, wherein the fuel is added only when the hydrogen gas and carbon monoxide of the educt have been consumed.

8. The process in accordance with claim 1, wherein a supply of the air for the exothermal reaction of the educt takes place only when a temperature of the at least one reformer has dropped below a minimum warm start temperature of the at least one reformer or below a temperature limit that is above said minimum warm start temperature.

9. The process in accordance with claim 1, wherein a supply of the air for the exothermal reaction of the educt is carried out such that a temperature of said at least one reformer does not drop below a minimum warm start temperature of said at least one reformer.

10. The process in accordance with claim 1, wherein heat transfer is carried out, by means of the educt, from the at least one fuel cell to the at least one reformer during the warm-holding mode before the air is supplied for the exothermal reaction of the educt.

11. The process in accordance with claim 10, wherein the heat transfer is carried out such that a temperature of the at least one reformer does not drop below the minimum warm start temperature of the at least one reformer or below a temperature limit that is above a minimum warm start temperature.

12. The process in accordance with claim 1, wherein a residual gas burner is arranged downstream of the at least one fuel cell and at least one of:
a burner waste gas path, which removes burner waste gas from the residual gas burner, is closed during the warm-holding mode, and
a fuel cell air path, which sends air to the at least one fuel cell, is closed during the warm-holding mode.

13. The process in accordance with claim 1, wherein heat from said exothermal reaction is transferred from said at least one reformer directly to said at least one fuel cell during said warm-holding mode.

14. A process for operating a fuel cell system, the process comprising:
providing a fuel cell system comprising a delivery means, at least one reformer with a catalyst and at least one fuel cell;
operating the at least one fuel cell;
switching off the fuel cell system;
carrying out a warm-holding mode after switching off the fuel cell system; and
during the warm-holding mode feeding an educt containing hydrogen and carbon monoxide directly from said at least one fuel cell to the at least one reformer via said delivery means and reacting the educt with air in the at least one reformer at the catalyst of said at least one reformer in an exothermal reaction, wherein heat from said at least one fuel cell is transferred directly to said at least one reformer via at least said educt, whereby said at least one reformer is maintained in a pre-heated condition via at least said educt during said warm-holding mode.

15. The process in accordance with claim 14, wherein heat from said exothermal reaction is transferred from said at least one reformer directly to said at least one fuel cell during said warm-holding mode.

16. A process for operating a fuel cell system, the process comprising:
providing a fuel cell system comprising at least one reformer with a catalyst and at least one fuel cell;
operating the at least one fuel cell;
switching off the fuel cell system;
carrying out a warm-holding mode after switching off the fuel cell system; and
during the warm-holding mode feeding an educt containing hydrogen and carbon monoxide to the at least one reformer and reacting the educt with air in the at least one reformer at the catalyst of said at least one reformer in an exothermal reaction, wherein heat from said at least one fuel cell is transferred to said at least one reformer via said educt without said educt passing through a heat exchanger, whereby said at least one reformer is maintained in a pre-heated condition via said educt during said warm-holding mode.

17. The process in accordance with claim 16, wherein said fuel cell system further comprises a delivery means, said heat from said fuel cell being transferred directly to said at least one reformer via said educt and said delivery means during said warm-holding mode.

18. The process in accordance with claim 16, wherein heat from said exothermal reaction is transferred from said at least one reformer directly to said at least one fuel cell during said warm-holding mode.

* * * * *

UNITED STATES PATENT AND TRADEMARK OFFICE
CERTIFICATE OF CORRECTION

PATENT NO. : 8,637,200 B2
APPLICATION NO. : 12/707093
DATED : January 28, 2014
INVENTOR(S) : Brandt et al.

It is certified that error appears in the above-identified patent and that said Letters Patent is hereby corrected as shown below:

Title Page: Item 75 insert

--ANDREAS KAUPERT, Esslingen (DE)-- as the third inventor.

Signed and Sealed this
Seventeenth Day of March, 2015

Michelle K. Lee
*Director of the United States Patent and Trademark Office*